Dec. 30, 1930.  A. COPONY  1,786,735
DECKING DEVICE FOR FREIGHT CARS
Filed Feb. 24, 1930
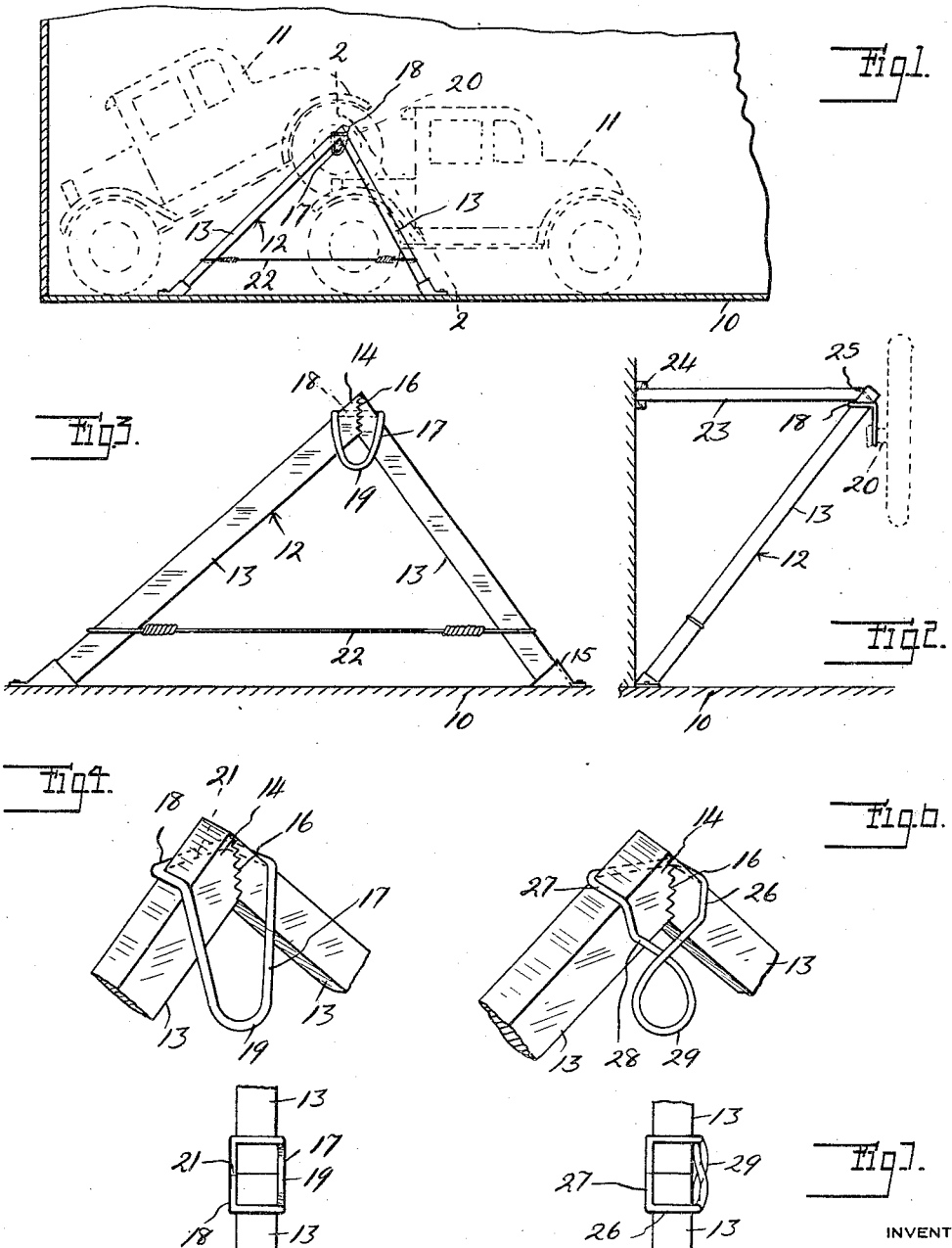

Patented Dec. 30, 1930

1,786,735

UNITED STATES PATENT OFFICE

ALFRED COPONY, OF MOUNT CLEMENS, MICHIGAN, ASSIGNOR TO COPONY AUTO LOADING COMPANY, OF DETROIT, MICHIGAN, A CORPORATION OF MICHIGAN

DECKING DEVICE FOR FREIGHT CARS

Application filed February 24, 1930. Serial No. 430,888.

This invention relates to automobile decking devices and more particularly to decking devices for automobiles or the like in freight cars.

The type of structure herein described is particularly adapted for half-decking the vehicles as distinguished from double-decking, and has as its objects to simplify, render more efficient and improve generally devices of this character.

Another important object of the invention is to provide a decking device which is distinguished by its simplicity, minimum manufacturing and maintenance costs, and the easy manner in which it may be assembled and disassembled.

Heretofore decking devices of this general character have been comparatively difficult and expensive to construct and assemble and likewise difficult to disassemble when undecking the vehicles. Moreover, with many of the known prior art decking devices it was economically necessary, owing to the cost thereof, to carefully remove the decking devices from the freight car and return the entire structure to the shipper, whereas with my invention the decking devices may be quickly disassembled without regard to the preservation of the frame members, it being the practice to only return to the shipper the metal saddle straps. This tends to make the use of my improved decking devices more economical and otherwise satisfactory.

The several objects, advantages and novel details of construction of this invention will be made more apparent as this description proceeds, especially when considered in connection with the accompanying drawings, wherein Figure 1 is a fragmentary vertical sectional view through a freight car showing the application of my improved decking devices;

Figure 2 is an enlarged vertical sectional view taken substantially on the plane indicated by line 2—2 in Figure 1;

Figure 3 is a side elevational view of one of the decking devices;

Figure 4 is a fragmentary perspective view of a portion of the frame members having the saddle strap associated therewith;

Figure 5 is a top plan view of the structure illustrated in Figure 4;

Figure 6 is a view similar to Figure 4 showing a modified form of construction, and Figure 7 is a top plan view of the structure illustrated in Figure 6.

Referring now more particularly to the drawings wherein like reference characters indicate like parts and especially to Figures 1 to 5 inclusive thereof, it will be noted that there is illustrated a fragment of a freight car or the like 10, in which automobiles or the like 11 are adapted to be half-decked. In accordance with this invention a pair of decking devices 12 are associated with one axle of the vehicle to support that end of the car raised from the floor of the freight car, whereupon the next automobile may be partly positioned thereunder to effect an economy in space.

Each of the decking devices 12 comprises a pair of frame members 13 which may be and preferably are of wood. These frame members have their upper ends 14 arranged in abutting relation, the frame members diverging downwardly and forming with the floor of the freight car a substantially triangular brace or supporting frame. The lower ends of each frame member may be secured to the floor of the freight car by toe-nailing the same thereto or by the use of shoes or the like 15.

The frame members 13 are separate or independent of one another, their upper ends 14 not being permanently connected to one another but merely arranged in abutting engagement. While the abutting faces of the frame members may be plain or smooth, it is preferably although not necessary, to provide these abutting ends with shouldered mating surfaces. In the embodiment of the invention herein illustrated, the abutting ends of the frame members are serrated as indicated at 16, but obviously relative sliding movement between the two frame members may be prevented in various other ways. If the abutting surfaces are plain or smooth, a nail or other fastening means may be driven through the abutting ends of the frame members.

For holding the frame members 13 in assembled relation, I provide a saddle member or strap 17 which has a loop-like portion 18 adapted to substantially surround or embrace the abutting ends 14 of the frame members. This saddle member 17 also has a saddle portion 19 adapted to engage the hub or axle 20 of the vehicle. The saddle member 17 is preferably made of metal and from a bar or the like of suitable length with the ends united by welding or the like as at 21.

Thus after the frame members 13 have been assembled with their ends 14 in abutting relation, the saddle member 17 may be slipped over these abutting ends, as clearly illustrated in the drawings, and this saddle member will not only act to maintain the frame members assembled, but will provide a supporting saddle for the hub or axle of the vehicle. Obviously the weight of the vehicle will act to draw the saddle member downwardly firmly into engagement with the diverging or inclined outer sides of the frame members so that with the vehicle supported on the decking devices, all liability of the frame members or saddle member becoming disassembled, is made impossible.

If desired, a flexible tension member 22 in the form of a wire or the like may be provided, and preferably is, to connect the lower ends of the diverging frame members 13.

As seen in Figure 2 it is generally customary in decking devices of this character to arrange the frame members 13 at an angle with respect to the side wall of the freight car and to provide a horizontal brace 23 extending from the side wall to the upper end of the supporting frame. One end of this brace may be toe-nailed or secured by blocks 24 to the side wall of the freight car and the other end toe-nailed as at 25 to the supporting frame 12.

In Figures 6 and 7 a slightly modified form of construction is illustrated. In this form of construction the saddle member 26 is provided with a loop-like portion 27 adapted to engage the abutting ends 14 of the frame member 13 and the legs 28 of the saddle member are then brought into intersecting relation with one another to form a saddle loop 29. However, as in the previously described construction, this saddle member is also readily removable from the frame members when the load has been removed therefrom, but when supporting the vehicle the saddle member will be drawn by the height thereof firmly into engagement with the frame members.

It will be obvious that with decking devices of this character, both the assembling and disassembling thereof may be quickly and easily accomplished. When the decking devices are disassembled, the saddle members are returned to the shipper, but owing to the inexpensive character of the remainder of the structure, it is unnecessary to preserve the same or to incur the expense incident to its return to the shipper. This obviously effects a great economy in the use of this decking device.

While several forms of the invention have been described herein somewhat in detail, it will be readily apparent to those skilled in this art that various changes and modifications may be resorted to without departing from the spirit and scope of this invention and to this end reservation is made to make such changes as may come within the purview of the accompanying claims.

What I claim as my invention is:

1. In an automobile decking device, a pair of downwardly diverging frame members having their upper ends arranged in abutting relation, and a hub supporting saddle having a portion substantially encircling the abutting ends of said frame members to support said saddle and to maintain said frame members assembled.

2. In an automobile decking device, a pair of downwardly diverging frame members having their upper ends arranged in abutting relation and a detachable hub supporting saddle substantially encircling the abutting ends of said frame members to support said saddle and to maintain said frame members assembled.

3. In a decking device for automobiles, a supporting frame including a pair of downwardly diverging frame members having their upper ends abutting and a readily removable hub supporting saddle substantially embracing said abutting ends and operative to maintain said frame members assembled.

4. In a decking device for automobiles and the like in freight cars, a pair of separate downwardly diverging frame members having their upper ends abutting, and a hub supporting saddle having a portion substantially surrounding said ends to hold them in abutting relation and to support said saddle thereon.

5. In a decking device for automobiles, a pair of separate downwardly diverging frame members having their upper ends abutting, and a hub supporting saddle having a substantial loop portion engaging the ends of said frame members to hold them in abutting relation and to support said saddle thereon.

6. In a decking device of the class described, a pair of diverging frame members having their upper ends arranged in abutting relation, and a hub supporting saddle having a loop portion engaging the abutting ends of said frame members and resting on the diverging sides thereof, said saddle acting to maintain said frame members assembled and having a portion for supporting a vehicle hub or axle.

7. In a decking device of the class described, a pair of separate downwardly diverging frame members having their upper ends abutting, and a saddle member having a portion circumferentially embracing the abutting ends of said frame members and having a saddle portion for supporting the axle of a vehicle.

8. In an automobile decking device, a pair of downwardly diverging frame members having their upper ends arranged in abutting relation, the abutting ends having mating surfaces, and a hub supporting saddle having a portion substantially embracing the abutting ends of said frame members to maintain said frame members assembled and having a portion for supporting the hub of the automobile.

9. In a decking device for automobiles, a pair of downwardly diverging frame members having their upper ends abutting, the abutting portions having correspondingly shaped surfaces interengaging to prevent relative movement between the frame members, and a supporting saddle having a portion substantially embracing the abutting ends of said frame members to maintain said frame members assembled and having a portion for receiving the end of the automobile axle.

10. In a decking device for automobiles, a saddle supporting frame including a pair of downwardly diverging frame members having their upper ends abutting, a saddle member removably engaging said abutting ends and operative to maintain said frame members assembled, and a flexible tension member connecting said frame members at a point spaced from their abutting ends.

11. In an automobile decking device, a pair of frame members having their upper ends arranged substantially in abutting relation, a hub supporting saddle having a portion engaging the abutting ends of said frame member to support said saddle and to maintain said frame members assembled and a brace member connected to said frame member and acting to prevent disengagement of said saddle.

12. In a decking device for automobiles, a pair of downwardly diverging frame members having their upper ends abutting, and a single loop-shaped hub supporting saddle member having one end of the loop engaging the ends of said frame members to hold them in abutting relation and to support the saddle member thereon, the other end of the loop constituting a saddle for supporting the axle of the automobile.

13. In a decking device for automobiles, a pair of downwardly diverging frame members having their upper ends abutting, and a double loop-shaped hub supporting saddle member having one of the loops thereof engaging the ends of said frame members to hold them in abutting relation and to support the saddle member thereon, the other loop constituting a saddle for supporting the axle of the automobile.

In testimony whereof I affix my signature.

ALFRED COPONY.